Aug. 18, 1925.
M. BELLIO
1,550,139
SALAMI WASHING APPARATUS
Filed Nov. 4, 1924 2 Sheets-Sheet 1
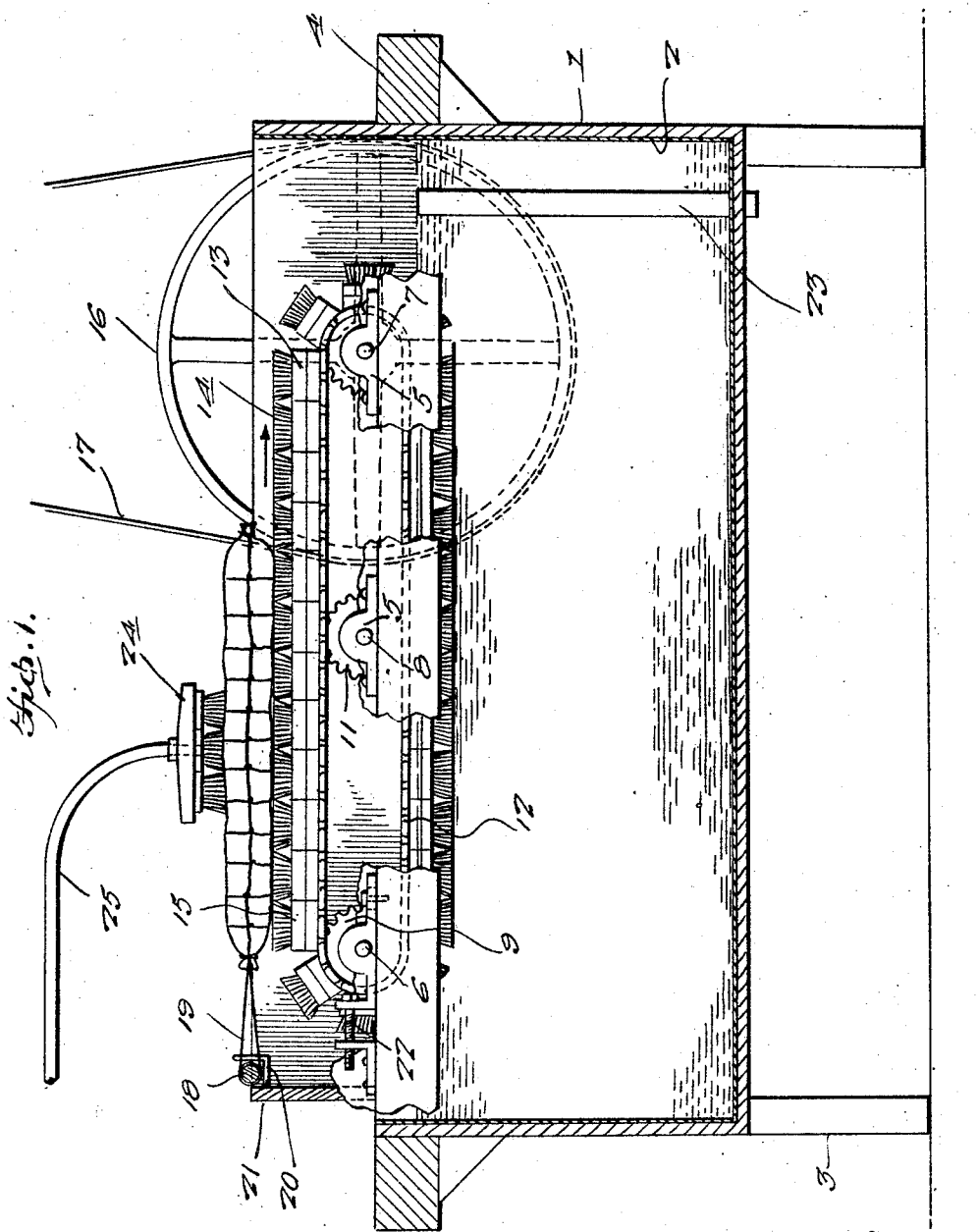

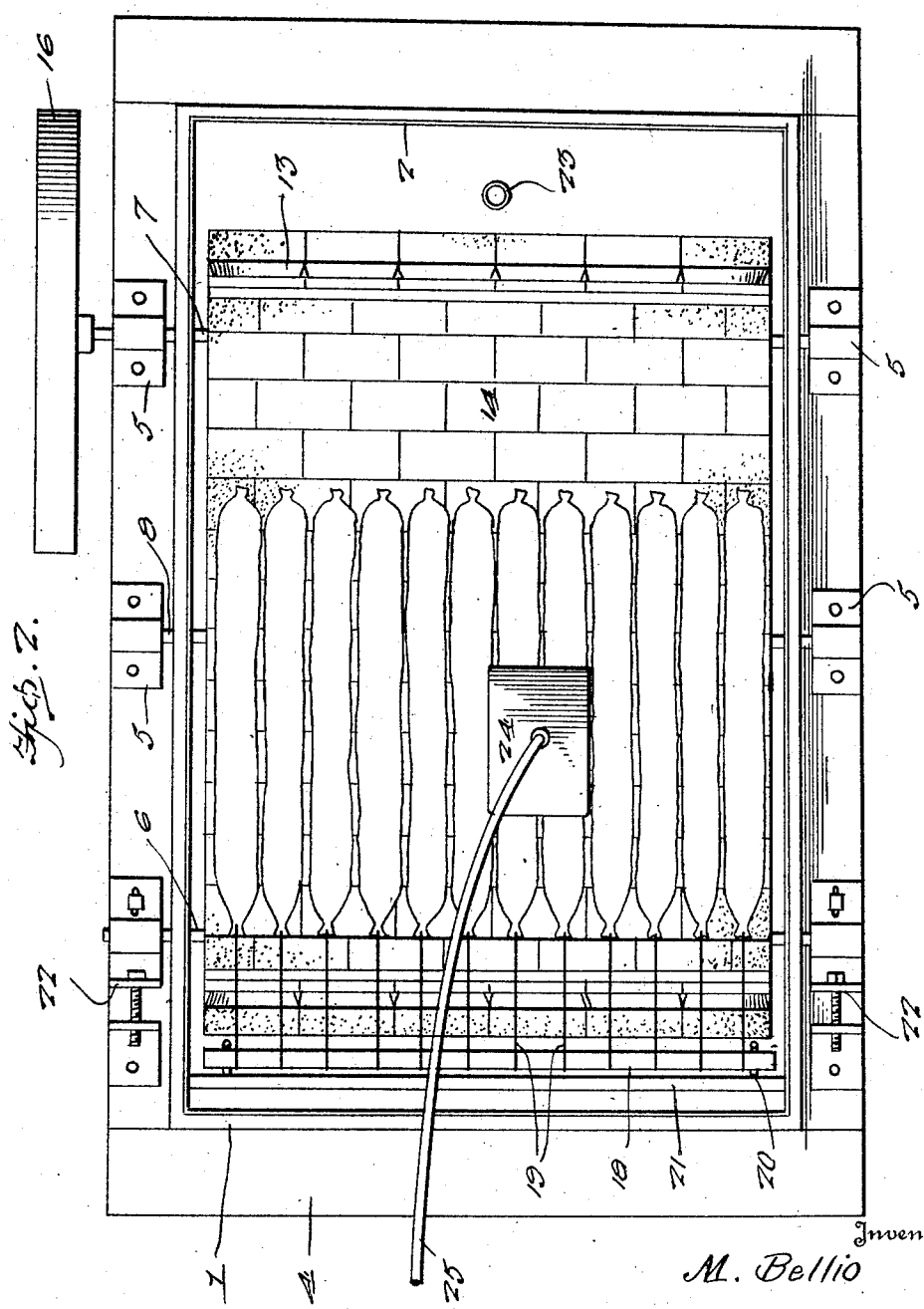

Patented Aug. 18, 1925.

1,550,139

UNITED STATES PATENT OFFICE.

MOSE BELLIO, OF EAST BOSTON, MASSACHUSETTS.

SALAMI-WASHING APPARATUS.

Application filed November 4, 1924. Serial No. 747,820.

*To all whom it may concern:*

Be it known that I, MOSE BELLIO, a subject of the King of Italy, residing at East Boston, in the county of Suffolk and State of Massachusetts, have invented certain new and useful Improvements in a Salami-Washing Apparatus, of which the following is a specification.

This invention relates to an apparatus for washing and cleaning salami and analogous food products.

One of the important objects of the present invention is to provide an apparatus of the above mentioned character, which will enable the surfaces of salami to be washed and cleaned whereby the slime which collects on the salami when the latter is kept for an indefinite period may be removed.

A further object of the invention is to provide a salami washing apparatus of the above mentioned character which will save considerable time and labor in cleaning the same, the apparatus being simple in construction, inexpensive, strong and durable and furthermore adapted for the purposes for which it is designated.

Other objects and advantages of the above invention will become apparent during the course of the following description.

In the accompanying drawings forming a part of this specification and in which like numerals designate like parts throughout the same:

Figure 1 is a longitudinal sectional view with parts shown in side elevation, and Figure 2 is a top plan view.

In the drawings wherein for the purpose of illustration is shown the preferred embodiment of my invention, the numeral 1 designates a substantially rectangular tank which is preferably formed of wood, the same being open at its top. A lining of zinc 2 is associated with the interior of the tank as clearly illustrated in Figure 1. The supporting legs for the tank whereby the latter is supported above the floor are illustrated at 3. A rectangular frame 4 is adapted to extend around the sides and ends of the tank adjacent the top thereof and the frame is secured to the tank by any suitable fastening means.

Journaled at their respective ends in suitable bearings 5 secured to the opposite sides of the frame 4 and extending transversely across the tank adjacent the top thereof are the shafts 6 and 7 which are supported adjacent the ends of the tank and an intermediate shaft 8. Suitable sprocket wheels 9, 10 and 11 respectively are carried by the shafts 6, 7 and 8 respectively adjacent the inner opposed faces of the sides of the tank and adapted to be trained over the sprocket wheels which are arranged in alignment. On each side of the tank is a sprocket chain 12 such as is clearly illustrated in Figure 1.

A series of brush heads 13 are arranged in rows which extend transversely across the chains, the brush heads in each of the rows being arranged in staggered relation with respect to the adjacent rows as clearly shown in Figure 2. It is of course to be understood that the brush heads are secured together so as to prevent the displacement of the same from the sprocket chains 12 whereby an endless series of brushes is provided. The bristles of the brush heads are illustrated at 14 and the means for securing the brush heads together as illustrated at 15.

A drive wheel 16 is carried by the outer end of the shaft 7 and a suitable belt 17 is associated with the drive wheel 16, the opposite end of the belt being associated with a suitable source of power (not shown) whereby the drive wheel 16 may be rotated for simultaneously causing the operation of the endless series of brushes. The series of brushes provide a means for supporting the salami thereon during the cleaning operation of the salami as is clearly illustrated in the drawing and for the purpose of preventing the forward movement of the salami on the brushes as the same travel around the sprocket wheels, in the direction of the arrow, the rear ends of the salami are fastened to a pole 18 by means of the cords 19. The pole 18 extends transversely across the top of the rear portion of the tank and is supported at its ends on suitable brackets 20 which are in turn carried by an upstanding board 21 which also extends transversely across the top of the rear end of the tank.

For the purpose of regulating the tension of the sprocket chain 12 and the series of brushes carried thereby, the bearings which support the shaft 6 are adapted for adjustment on the frame 4 by the adjusting means designated generally by the numeral 22 and as the same may be of any well known construction, a further detailed description thereof is not thought necessary.

The tank 1 is adapted to be filled with water to a predetermined height whereby certain of the brushes will be submerged in the water and as the endless chains rotate around the sprocket wheels, all of the brushes will become submerged in successive order. An overflow pipe 23 is associated with the tank 1 as shown in Figure 1.

It is obvious from the construction shown and above described that when the sprocket chains travel over the sprocket wheels, and the salami are placed on the series of brushes carried by the sprocket chains, the bristles 14 of the brush heads 13 will engage the bottom surfaces of the salami thereby washing and brushing the same so as to remove any slime which may have collected on the portions of the salami in engagement with the bristles of the brushes. For the purpose of cleaning the upper surfaces of the salami while the same are disposed over the endless series of brushes, I provide the hand actuated brush member 24, the same having a water supply pipe 25 associated therewith whereby water may be discharged through the brush 24 onto the upper surfaces of the salami so as to assist in efficiently removing the slime from the upper surfaces of the salami. The water passing through the brush 24 will of course be discharged into the tank 1.

After the salami have been thoroughly washed and brushed, the pole 18 may be removed from the brackets 20 and the salami will be suspended from the pole by the fastening cords 19 to facilitate the drying of the salami.

It will thus be seen from the foregoing description, that an apparatus for washing salami or other analogous food products has been provided which will save considerable time and labor in cleaning the food products.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

1. A salami cleaning apparatus comprising a tank adapted to be filled with water, a series of brushes mounted on an endless chain in the upper portion of the tank, said brushes adapted to submerge in said water and further adapted to support salami thereon and clean the bottom surfaces thereof, and a pole extending transversely across the top of the tank at one end thereof, cords extending around said pole and fastened to the adjacent ends of said salami.

2. A cleaning apparatus of the class described including a tank adapted to be filled with water, an endless conveyor mechanism movable over the top of the tank, brushes fixed thereto and adapted to be submerged thereby in the water of the tank when at the bottom of the conveyor mechanism and adapted to support salami when at the top of the conveyor mechanism, a pole detachably mounted on the tank, and cords attached to said pole and to the ends of the salami supported on the brushes.

In testimony whereby I affix my signature.

MOSE BELLIO.